United States Patent [19]

Pipher et al.

[11] Patent Number: 5,417,278
[45] Date of Patent: May 23, 1995

[54] NEW AND IMPROVED HEAT EXCHANGERS FOR HEATING ROOMS WITH HEAT FROM DRYERS

[76] Inventors: Lynn E. Pipher, 116 Long Pond Rd., Rochester, N.Y. 14612; Richard J. Dietz, 162 N. Greece Rd., Hilton, N.Y. 14468

[21] Appl. No.: 181,292

[22] Filed: Jan. 13, 1994

[51] Int. Cl.[6] ............................................. F26B 19/00
[52] U.S. Cl. .............................. 165/104.11; 165/901; 34/86
[58] Field of Search ................ 34/86; 165/901, 104.11

[56] References Cited

U.S. PATENT DOCUMENTS

| | | | |
|---|---|---|---|
| 2,879,976 | 3/1959 | Rose, Sr. | 165/901 |
| 3,934,798 | 1/1976 | Goldsmith | 165/901 |
| 4,034,482 | 7/1977 | Briscoe | 34/86 |

*Primary Examiner*—A. Michael Chambers

[57] ABSTRACT

A heat exchanger for heating rooms with heat from a dryer comprising a container in a generally rectangular configuration with a centrally located heating chamber therewithin; a first air-inlet opening and a first air-outlet opening in axial alignment defining a first airflow path through the container for the passage of air from the atmosphere in a room for being heated and for discharging the heated air to the room; a dryer air-inlet and a dryer air-outlet in axial alignment defining a second airflow path through the container generally perpendicular to the first airflow path; a fan in the first air-inlet opening of the first airflow path prior to the chamber to effect the flow of air from a room through the chamber and to exterior thereof; and means within the chamber for directing the flow of air from the dryer whereby hot air from the dryer passing through the chamber will pass therethrough to preclude such dryer air and any contaminants from coming into direct contact with air flowing along the second airflow path.

2 Claims, 2 Drawing Sheets

NEW AND IMPROVED HEAT EXCHANGERS FOR HEATING ROOMS WITH HEAT FROM DRYERS

BACKGROUND OF THE INVENTION

1. Field of the Invention

The present invention relates to new and improved heat exchangers for heating rooms with heat from dryers and more particularly pertains to heating rooms with dryers by the hot-air discharge of the dryer.

2. Description of the Prior Art

The use of devices for generating heat is known in the prior art. More specifically, devices for generating heat heretofore devised and utilized for the purpose of heating rooms through heating mechanisms are known to consist basically of familiar, expected, and obvious structural configurations, notwithstanding the myriad of designs encompassed by the crowded prior art which has been developed for the fulfillment of countless objectives and requirements.

The prior art discloses a large number of devices for generating heat. By way of example, U.S. Pat. No. 3,969,070 to Thompson discloses a clothes dryer with heat reclaimer.

U.S. Pat. No. 4,095,349 to Parker discloses a heat exchanger for clothes dryer.

U.S. Pat. No. 4,930,571 to Paull discloses a heat recovery apparatus.

Lastly, U.S. Pat. No. 5,117,563 to Castonguay discloses a heat recuperator from clothes dryer.

In this respect, new and improved heat exchangers for heating rooms with heat from dryers according to the present invention substantially depart from the conventional concepts and designs of the prior art, and in doing so provide an apparatus primarily developed for the purpose of heating rooms with dryers by the hot-air discharge of the dryer.

Therefore, it can be appreciated that there exists a continuing need for new and improved heat exchangers for heating rooms with heat from dryers which can be used for heating rooms with dryers by the hot-air discharge of the dryer. In this regard, the present invention substantially fulfills this need.

SUMMARY OF THE INVENTION

In view of the foregoing disadvantages inherent in the known types of devices for generating heat now present in the prior art, the present invention provides new and improved heat exchangers for heating rooms with heat from dryers. As such, the general purpose of the present invention, which will be described subsequently in greater detail, is to provide new and improved heat exchangers for heating rooms with heat from dryers and methods which have all the advantages of the prior art and none of the disadvantages.

To attain this, the present invention essentially comprises a new and improved heat exchanger for heating rooms with heat from a dryer comprising, in combination, a container in a generally rectangular configuration with a centrally located heating chamber therewithin; a first air-inlet opening and a first air-outlet opening in axial alignment defining a first airflow path through the container for the passage of air from the atmosphere in a room for being heated and for discharging the heated air to the room; a dryer air-inlet and a dryer air-outlet in axial alignment defining a second airflow path through the container generally perpendicular to the first airflow path; a fan in the first air-inlet opening of the first airflow path prior to the chamber to effect the flow of air from a room through the chamber and to exterior thereof; a plurality of tubes parallel with each other secured within the chamber, each of the tubes defining airflow paths parallel with, and part of, the second airflow path for the passage of hot air from the dryer through the chamber and to exterior thereof; a pair of apertured plates at the ends of the tubes with the ends of the tubes aligned with the apertures of the plates whereby hot air from the dryer passing through the chamber will pass through the tubes to heat the tubes but preclude such dryer air and any contaminants from coming into direct contact with air flowing along the second flow path; and a thermostat located in the hot dryer air inlet to determine the temperature thereof and to activate and inactivate the fan in response thereto.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form The subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved heat exchangers for heating rooms with heat from dryers which have all the advantages of the prior art devices for generating heat and none of the disadvantages.

It is another object of the present invention to provide new and improved heat exchangers for heating rooms with heat from dryers which may be easily and efficiently manufactured and marketed.

It is a further object of the present invention to provide new and improved heat exchangers for heating rooms with heat from dryers which are of a durable and reliable construction.

An even further object of the present invention is to provide new and improved heat exchangers for heating rooms with heat from dryers which are susceptible of a low cost of manufacture with regard to both materials and labor, and which accordingly are then susceptible of low prices of sale to the consuming public, thereby making such new and improved heat exchangers for heating rooms with heat from dryers economically available to the buying public.

Still yet another object of the present invention is to provide new and improved heat exchangers for heating rooms with heat from dryers which provide in the apparatuses and methods of the prior art some of the advantages thereof, while simultaneously overcoming some of the disadvantages normally associated therewith.

Even still another object of the present invention is to heat rooms with dryers by the hot-air discharge of the dryer.

Lastly, it is an object of the present invention to provide a heat exchanger for heating rooms with heat from a dryer comprising a container in a generally rectangular configuration with a centrally located heating chamber therewithin; a first air-inlet opening and a first air-outlet opening in axial alignment defining a first airflow path through the container for the passage of air from the atmosphere in a room for being heated and for discharging the heated air to the room; a dryer air-inlet and a dryer air-outlet in axial alignment defining a second airflow path through the container generally perpendicular to the first airflow path; a fan in the first air-inlet opening of the first airflow path prior to the chamber to effect the flow of air from a room through the chamber and to exterior thereof; and means within the chamber for directing the flow of air from the dryer whereby hot air from the dryer passing through the chamber will pass therethrough to preclude such dryer air and any contaminants from coming into direct contact with air flowing along the second airflow path.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
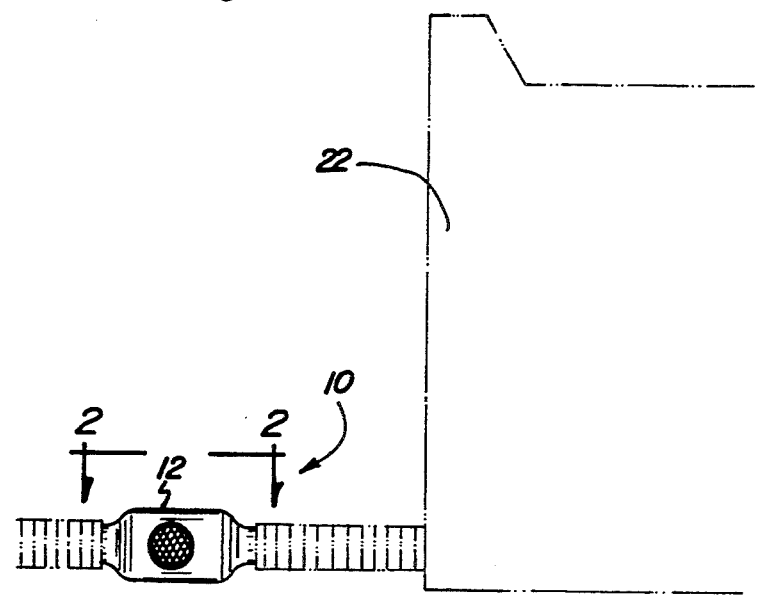
FIG. 1 is a side elevational view of the preferred embodiment of the new and improved heat exchangers for heating rooms with heat from dryers constructed in accordance with the principles of the present invention.
Figure 2:
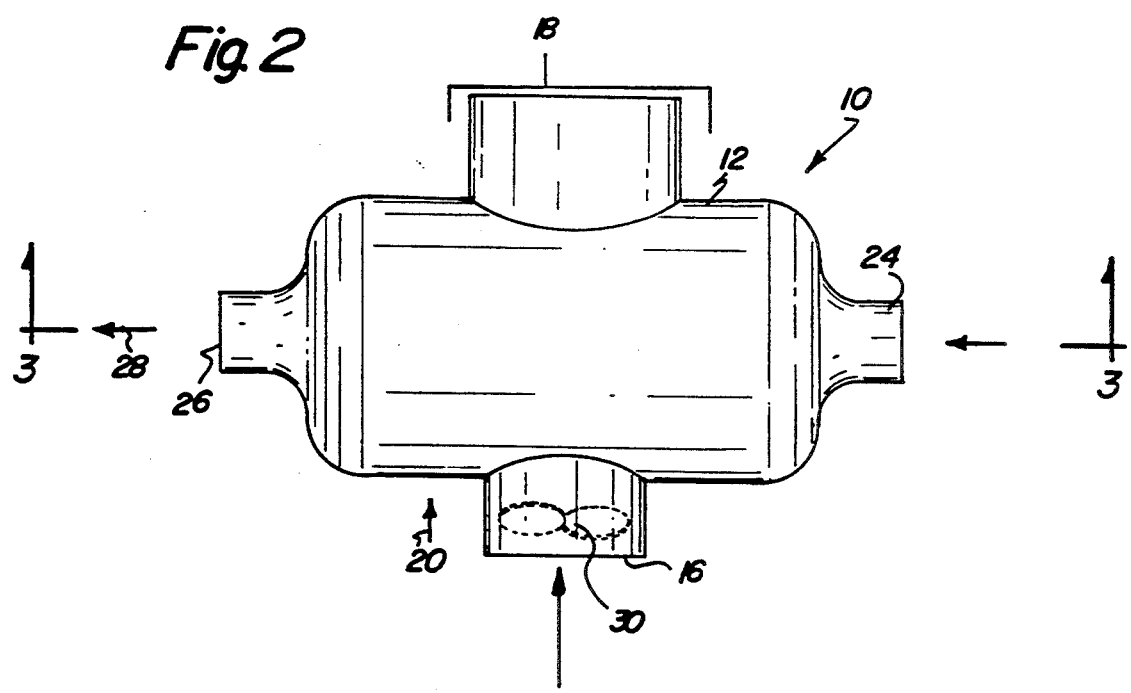
FIG. 2 is a top elevational view of the device shown in FIG. 1.
Figure 3:
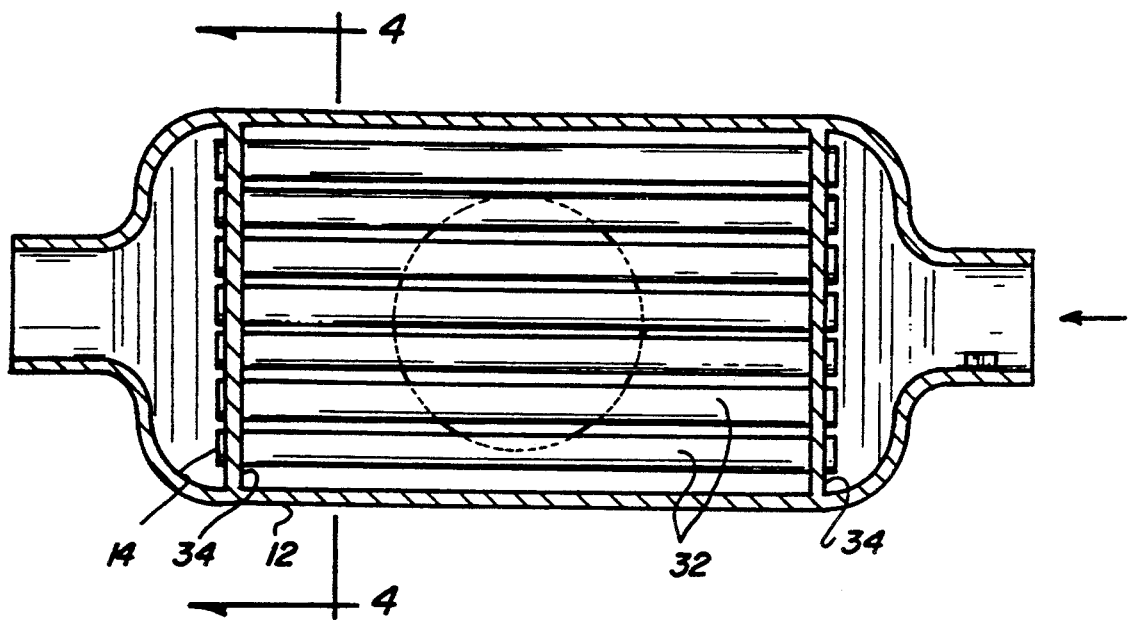
FIG. 3 is a sectional view of the device shown in FIG. 2 taken along line 3—3 of FIG. 2.
Figure 4:
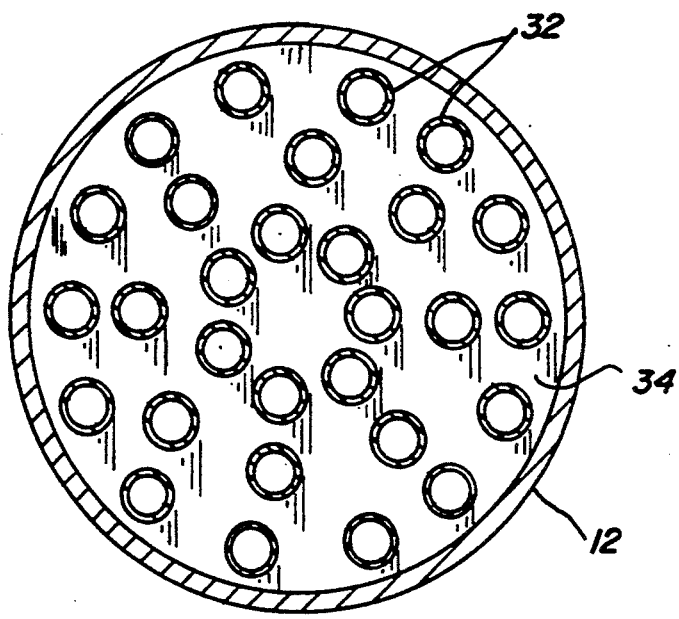
FIG. 4 is a sectional view of the device of the prior Figures taken along line 4—4 of FIG. 3.

With reference now to the drawings, and in particular to FIGS. 1 through 4 thereof, the preferred embodiment of the new and improved heat exchangers for heating rooms with heat from a dryer embodying the principles and concepts of the present invention and generally designated by the reference numeral 10 will be described.

Specifically, the present invention, the new and improved heat exchangers for heating rooms with heat from dryers may be considered as a system 10 comprised of a plurality of components. Such components include a container, a first air-flow path, a second air-flow path, a fan, tubes and plates, and a thermostat. The individual components are specifically configured and correlated one with respect to the other to attain the desired objectives.

More specifically, the system 10 includes a container 12. The container is in a generally rectangular configuration. Centrally located therein is a heating chamber 14 through which various airflows are directed. The airflows are arranged in a heat exchanging relationship.

Associated with the container 12 is a first air-inlet opening 16 and a first air-outlet opening 18. Such openings are in axial alignment defining a first airflow path as designated by the arrow 20. Such path extends from one end of the container to the other. Such airflow path is designed for the passage of ambient air from the atmosphere in a room to be heated, preferably the room containing the clothes dryer 22 which is to supply the heat for heating the room. Such first airflow path terminates in the air-outlet opening for discharge of the heated air to the room in which the container is located. Locating the dryer, container, and the room to be heated at different locations constitutes an alternate embodiment of the invention.

The next major component of the system 10 is a dryer air-inlet 24 and an associated dryer air-outlet 26. Such outlets are in axial alignment and defined therebetween a second airflow path as shown by the arrow 28. Such airflow path extends through the container generally perpendicular to the first airflow path.

Located in the first inlet opening is a fan 30. This is at the beginning of the first airflow path prior to the chamber. The function of the fan is to effect the flow of air from a room in which the chamber is located, then through the chamber, and then to exterior of the chamber for heating the room.

Next provided are a plurality of tubes 32. Such tubes are arranged parallel with each other and are secured within the chamber. Such tubes are located in the second airflow path and are a central extent thereof. Such second airflow path including the tubes is for the passage of hot air from the dryer through the chamber and to exterior thereof.

Secured with respect to the tubes and the chamber are a pair of spaced parallel aperture plates 34. Such plates are located at the ends of the tubes. The ends of the tubes are aligned with the apertures of the plate. In this manner, with the plate extended to the interior faces of the chamber, hot air from the dryer passing through the chamber will pass through the tubes in the central extent of the chamber. In this manner, the heat of the tubes will effect the heating of the air in the first flow path for heating the air of the room. It will, however, preclude the dryer air and any contaminants contained within such air from coming into direct contact with the air flowing along the second flow path. In this manner, the heated air entering the room is clean and ecologically safe.

One last component of the system is a thermostat 36. This thermostat is located in the hot dryer air-inlet. It is used to determine the temperature of the air coming in contact therewith. Such thermostat is electrically coupled to the fan so that when the air entering to the hot dryer air-inlet is cool, the fan will not move air through the chamber for being heated. When, however, the dryer air is hot, capable of heating the air passing through the chamber for heating the room, then the fan will be energized.

The present invention is designed to recirculate hot air given off by a clothes dryer. The recirculated air can be used as one source of heat for a home instead of being wastefully vented outside, where it does no good at all. Moreover, unlike other such products on the market, the present invention is neat and clean, and causes no problem with gas from the dryer escaping into the house.

The present invention is activated by a thermostat located where the clothes dryer enters the exchanger. When air is sufficiently warm, a fan is activated that blows the warm air into the surrounding room.

No lint nor moisture is transferred into the user's room because of the unique design of this product. A total of 18 inches long and 15 inches wide at the widest point, the present invention features 30 aluminum tubes positioned between the air intake from the dryer at one end and the cool air exhaust at the other. This cool air exhaust is vented to the outside. As the hot air proceeds through the aluminum tubes, they heat up rapidly due to their physical properties.

A fan is positioned to blow across the tubes in a direction perpendicular to the air flowing through the tubes. The exhaust from this fan goes into the user's room. By blowing hot air generated by the heated tubes instead of blowing hot air directly from the dryer, the lint and moisture problem is handily avoided. All odors from products which can be added to a clothes dryer, such as those that eliminate the static build-up in certain fabrics, are directed through the aluminum tubes. The system is clean, odorless and effective.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved heat exchanger for heating rooms with heat from a dryer comprising, in combination:

a container in a generally rectangular configuration with a centrally located heating chamber therewithin;

a first air-inlet opening and a first air-outlet opening in axial alignment defining a linear first airflow path through the container for the passage of air from the atmosphere in a room for being heated and for discharging the heated air to the room;

a dryer air-inlet and a dryer air-outlet in axial alignment defining a linear second airflow path through the container generally perpendicular to the first airflow path;

a fan in the first air-inlet opening of the first airflow path prior to the chamber to effect the flow of air from a room through the chamber and to exterior thereof;

a plurality of tubes parallel with each other secured within the chamber, each of the tubes defining airflow paths parallel with, and part of, the second airflow path for the passage of hot air from the dryer through the chamber and to exterior thereof;

a pair of apertured plates at the ends of the tubes with the ends of the tubes aligned with the apertures of the plates whereby hot air from the dryer passing through the chamber will pass through the tubes to heat the tubes but preclude such dryer air and any contaminants from coming into direct contact with air flowing along the second flow path; and a thermostat located in the hot dryer air inlet to determine the temperature thereof and to activate and inactivate the fan in response thereto.

2. The device as set forth in claim 1 and further including:

a thermostat located in the hot dryer air-inlet to determine the temperature thereof and to activate and inactivate the fan in response thereto.

* * * * *